US012787992B2

(12) United States Patent
Kokuga

(10) Patent No.: US 12,787,992 B2
(45) Date of Patent: Nov. 10, 2026

(54) LURE

(71) Applicant: Shimano Inc., Sakai (JP)

(72) Inventor: Kimio Kokuga, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 19/022,875

(22) Filed: Jan. 15, 2025

(65) Prior Publication Data

US 2025/0248382 A1 Aug. 7, 2025

(30) Foreign Application Priority Data

Feb. 2, 2024 (JP) ................................. 2024-015288

(51) Int. Cl.
*A01K 85/00* (2006.01)

(52) U.S. Cl.
CPC ................................ *A01K 85/1841* (2022.02)

(58) Field of Classification Search
CPC .... A01K 85/1841; A01K 85/00; A01K 85/01; A01K 85/011; A01K 85/012; A01K 85/013; A01K 85/015; A01K 85/017; A01K 85/18; A01K 85/1837; A01K 85/1873; A01K 85/1847; A01K 85/16
USPC ........... 43/42.22, 42.31, 42.32, 42.33, 42.35, 43/42.39, 17.6
See application file for complete search history.

(56) References Cited

U.S. PATENT DOCUMENTS 2,190,791 A * 2/1940 Larson .................. A01K 85/01 362/253
2,521,555 A * 9/1950 Widmer ................. A01K 85/02 43/42.36
2,609,633 A * 9/1952 Cracker ................. A01K 85/16 43/42.36
2,629,960 A * 2/1953 Baxter .................. A01K 85/16 43/42.12
2,750,701 A * 6/1956 Beames ................. A01K 85/16 43/42.47
3,266,185 A * 8/1966 Abramson, Jr. ....... A01K 85/02 43/37
3,693,275 A * 9/1972 Craig ..................... A01K 85/00 43/42.35
4,453,335 A * 6/1984 Smith .................... A01K 85/16 43/42.31
4,761,910 A * 8/1988 Ninomiya .............. A01K 85/16 43/42.22
5,381,622 A * 1/1995 Tregre .................. A01K 85/01 43/42.31

(Continued)

FOREIGN PATENT DOCUMENTS

JP 2021-193921 A 12/2021

*Primary Examiner* — Maria E Graber
(74) *Attorney, Agent, or Firm* — Spencer Fane, LLP

(57) ABSTRACT

A lure includes a main body, a support part, a weight, and a guide portion. The main body has a head at a front portion and a tail at a rear portion. The support part extends in a front-rear direction inside the main body. The support part is able to elastically deform in an intersecting direction that intersects with the front-rear direction. The weight is supported by the support part inside the main body. The guide portion is provided on the inner surface of the main body. The guide portion is provided on an inner surface of the main body and guides the weight in the front-rear direction or the intersecting direction.

11 Claims, 10 Drawing Sheets

(56) References Cited

U.S. PATENT DOCUMENTS

| | | | | |
|---|---|---|---|---|
| 5,992,084 | A * | 11/1999 | Kitagawa | A01K 85/16<br>43/42.22 |
| 6,202,337 | B1 * | 3/2001 | Yoshida | A01K 85/16<br>43/42.31 |
| 6,301,822 | B1 * | 10/2001 | Zernov | A01K 85/01<br>43/42.31 |
| 6,671,996 | B1 * | 1/2004 | Ito | A01K 85/16<br>43/42.31 |
| 7,207,134 | B1 * | 4/2007 | Tsai | A01K 85/16<br>43/42.31 |
| 11,000,022 | B2 * | 5/2021 | Choi | A01K 85/16 |
| 11,716,979 | B2 * | 8/2023 | Yagi | A01K 85/16<br>43/42 |
| 12,010,980 | B2 * | 6/2024 | Nakamichi | A01K 85/015 |
| 2002/0104250 | A1 * | 8/2002 | West | A01K 85/01<br>43/17.1 |
| 2005/0034349 | A1 * | 2/2005 | Dugger | A01K 85/01<br>43/17.1 |
| 2015/0264902 | A1 * | 9/2015 | Scharle | A01K 85/01<br>43/42.31 |
| 2018/0249692 | A1 * | 9/2018 | Choi | A01K 85/00 |
| 2019/0320634 | A1 * | 10/2019 | Kawasaki | A01K 85/01 |
| 2021/0274762 | A1 * | 9/2021 | Yagi | A01K 85/01 |
| 2021/0274763 | A1 * | 9/2021 | Yagi | A01K 85/12 |
| 2021/0386043 | A1 * | 12/2021 | Yamane | A01K 85/16 |
| 2022/0061280 | A1 * | 3/2022 | Nakamichi | A01K 85/01 |
| 2023/0189776 | A1 * | 6/2023 | Kawasaki | A01K 85/01<br>43/42.35 |

* cited by examiner

LURE

CROSS-REFERENCE TO RELATED APPLICATIONS

This application claims priority to Japanese Patent Application No. 2024-015288, filed on Feb. 2, 2024. The entire disclosure of Japanese Patent Application No. 2024-015288 are hereby incorporated by reference.

BACKGROUND

Technical Field

The present disclosure relates to a lure.

Background Information

A conventional lure is disclosed in Japanese Laid-Open Patent Application No. 2021-193921, which comprises a body, a shaft, a weight, and an elastic member. The shaft is made of a straight wire material. The shaft extends linearly in the front-rear direction inside the body. The weight is supported by a guide member so as to be movable in the front-rear direction inside the body. The elastic member biases the weight forward.

In this type of lure, when casting the lure, the weight moves to the tail side, due to inertial force, linearly along the shaft while compressing the elastic member. When the lure lands on water, the weight is pushed back to the head side by the biasing force of the elastic member, linearly along the shaft. With this movement of the weight, the attitude of the lure at the time of casting and the attitude of the lure at the time of landing on water are suitably maintained. In addition, when the lure swims, the weight moves in the front-rear direction linearly along the shaft, in accordance with an external force that acts on the lure.

SUMMARY

In the lure of Japanese Laid-Open Patent Application No. 2021-193921, the shaft is formed in a straight line. In this case, it has been determined that the movement path of the weight is limited to being straight, and it is difficult to dispose the weight at positions thought to be optimal depending on the shape and internal structure of the lure. Conversely, the movement path of the weight affects the shape and internal structure of the lure. In the lure of Japanese Patent No. 3448184, a plurality of weights are guided by a movement passage formed inside the lure. In this case, it has been determined that the shape of the weight is limited to a sphere or a similar shape, and the attitude of the weight in the movement passage (position of the center of gravity of the entire weight) is not stable.

An object of the present disclosure is to provide a lure with which it is possible to suitably set the position of the center of gravity, including the movement path of the weight.

In a first aspect of the present disclosure, a lure comprises a main body, a support part, a weight, and a guide portion. The main body has a head at the front portion and a tail at the rear portion. The support part extends in the front-rear direction inside the main body. The support part is configured to be able to elastically deform in an intersecting direction that intersects with the front-rear direction. The weight is supported by the support part inside the main body. The guide portion is provided on an inner surface of the main body. The guide portion guides the weight in the front-rear direction and/or the intersecting direction.

In the present lure, the weight moves while being guided by the guide portion. At this time, the support part elastically deforms in the intersecting direction in accordance with the position of the weight. With this configuration, it is possible to suitably set the position of the center of gravity of the lure while stabilizing the attitude and the position of the center of gravity of the weight. In addition, it is possible to suitably set the movement path of the weight.

A second aspect of the present disclosure is the lure according to the first aspect, further comprising a restricting portion. The restricting portion restricts at least one end portion of the support part from moving in the front-rear direction with respect to the main body. With this configuration, the support part can be reliably positioned relative to the main body by the restricting portion.

A third aspect of the present disclosure is the lure according to the first or second aspect, further comprising slit portions. The slit portions are provided on the head side, and at least the head side of the tail side. The slit portions guide the end portion of the support part in the intersecting direction. With this configuration, the direction of movement of the support part can be easily set by the slit portions.

A fourth aspect of the present disclosure is the lure according to the first or second aspect, configured as follows. The weight moves between a first position on the head side and a second position on the tail side. The guide portion extends in the front-rear direction and/or the intersecting direction such that, when in the second position on the tail side, the weight is located above a first position on the head side. With this configuration, when the weight is located at the second position on the tail side, the center of gravity of the lure can be set high on the tail side.

A fifth aspect of the present disclosure is the lure according to the fourth aspect, configured as follows. The guide portion is a protruding portion that protrudes from the inner surface of the main body, or a recessed portion that is recessed from the inner surface of the main body. The weight has an engagement portion that engages with the protruding portion or the recessed portion. With this configuration, it is possible to stably move the weight along the guide portion.

A sixth aspect of the present disclosure is the lure according to the first or second aspect, configured as follows. The main body further comprises a trunk provided between the head and the tail. The guide portion is provided in the trunk such that the weight moves in the trunk above the first position on the head side and the second position on the tail side.

In this configuration, the weight is offset upward in the trunk when moving between the first position on the head side and the second position on the tail side. For example, when the weight moves from the first position on the head side to the second position on the tail side, the center of gravity of the lure can be positioned at the center in the vertical direction in the trunk, and then the center of gravity of the lure can be set low at the second position on the tail side.

A seventh aspect of the present disclosure is the lure according to the sixth aspect, configured as follows. The guide portion is a protruding portion provided on the inner surface of the lower side of the trunk. With this configuration, the weight can be easily offset upward in the trunk.

An eighth aspect of the present disclosure is the lure according to the first or second aspect, further comprising a biasing member that biases the weight at least in a forward direction. With this configuration, the weight can be easily returned to the head side.

In a ninth aspect of the present disclosure, a lure comprises a main body, a support part, a weight, and a biasing member. The main body has a head at the front portion and a tail at the rear portion. The support part extends in the front-rear direction inside the main body. The support part is configured to be able to elastically deform in an intersecting direction that intersects with the front-rear direction. The weight is supported by the support part inside the main body. The biasing member biases the weight at least toward the head side.

In the present lure, the weight moves while being guided by the support part. At this time, the support part elastically deforms in the intersecting direction in accordance with the position of the weight. With this configuration, it is possible to suitably set the position of the center of gravity of the lure while stabilizing the attitude and the position of the center of gravity of the weight.

According to the present disclosure, it is possible to suitably set the position of the center of gravity including the movement path of the weight in a lure.

DETAILED DESCRIPTION

First Embodiment

Figure 2:
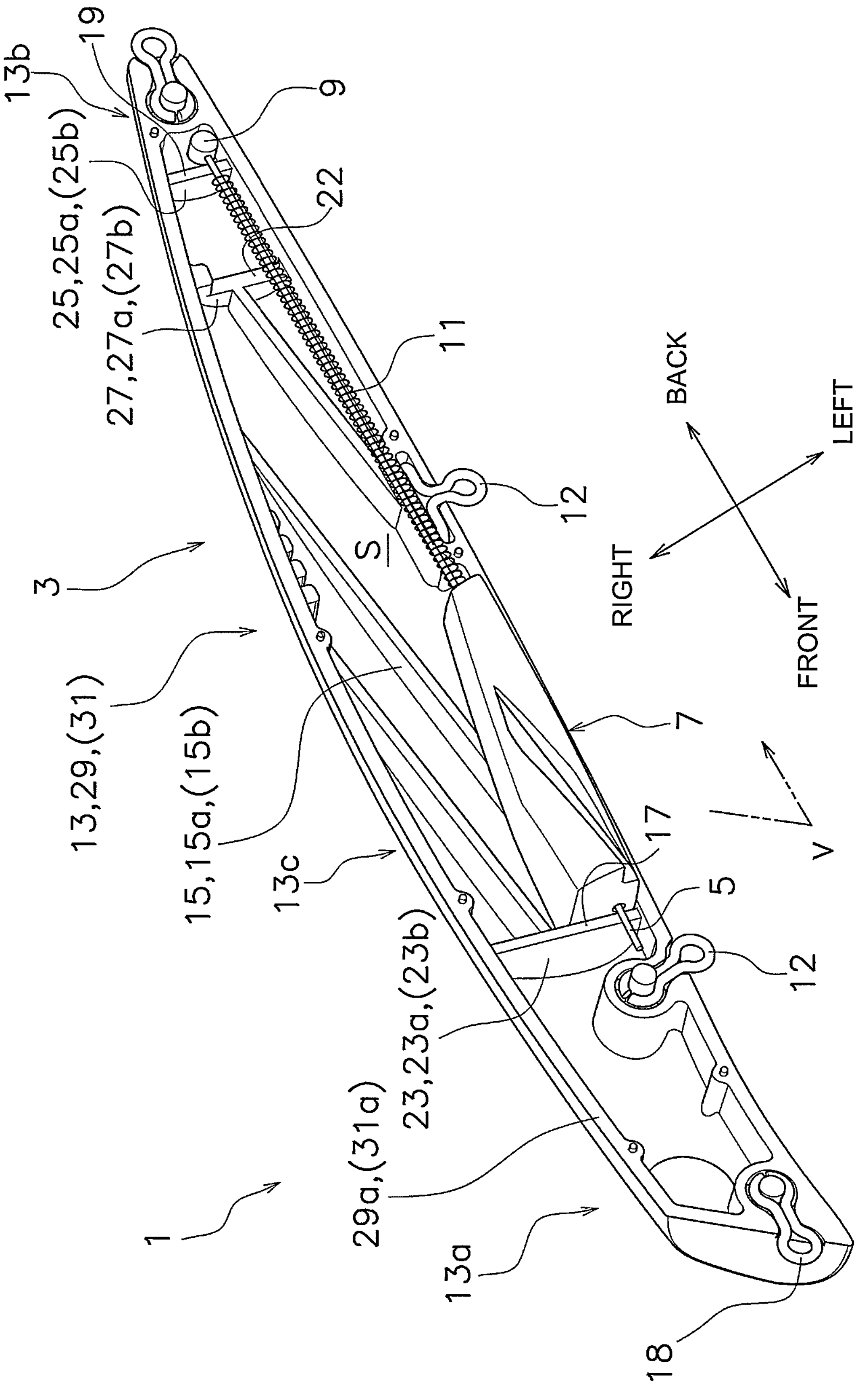
FIG. 2 is a perspective view for explaining an internal structure of the lure when a weight is located on a head side.
Figure 3:
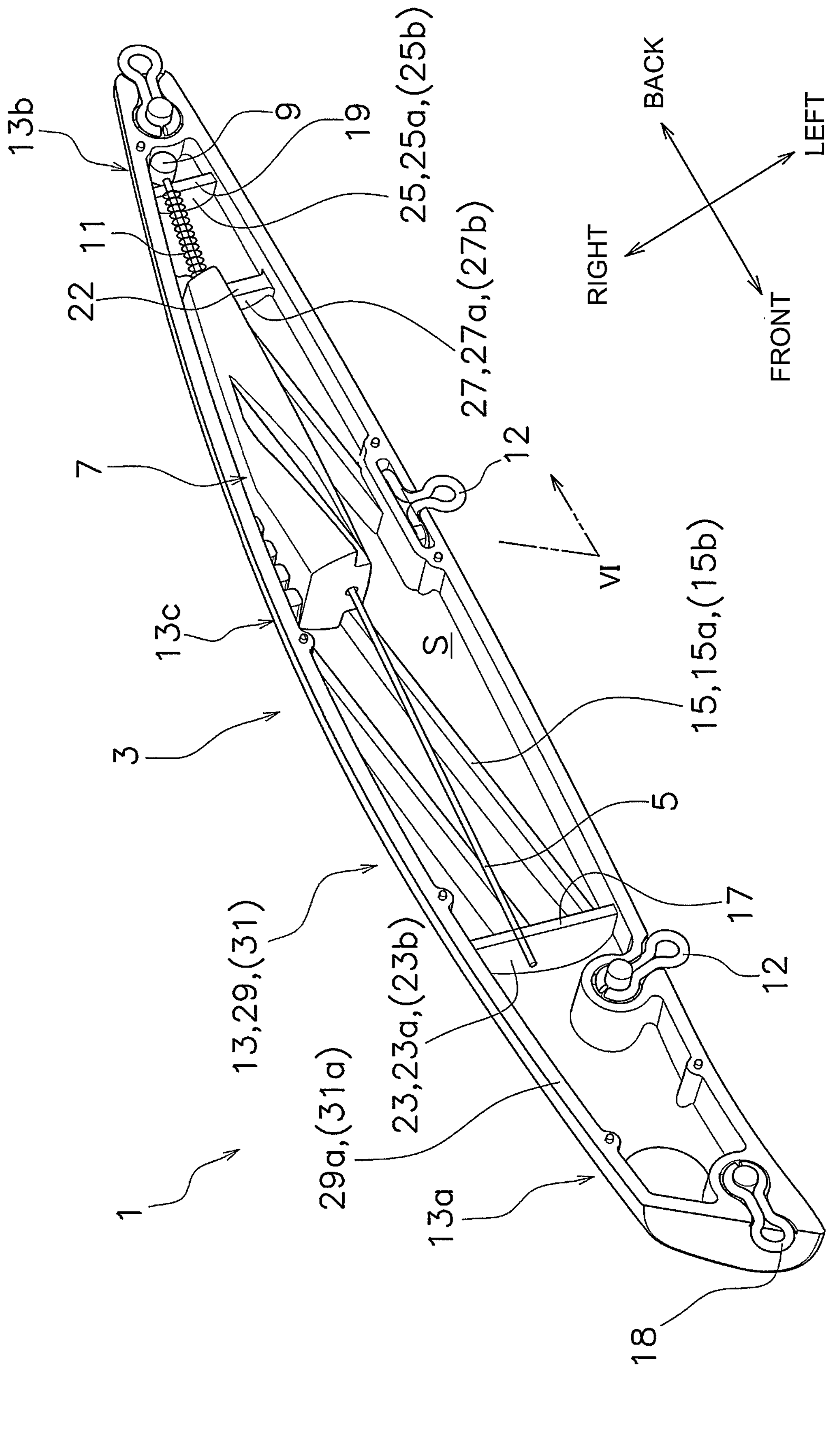
FIG. 3 is a perspective view for explaining an internal structure of the lure when the weight is located on a tail side.

In the first embodiment, the lure according to the present disclosure will be described with reference to a lure 1 shown in FIG. 1. As shown in FIGS. 2 and 3, the lure 1 comprises a body 3, a support part (support) 5, a weight 7, a restricting member 9 (one example of a restricting portion), and a biasing member 11.

Body

As shown in FIG. 2, the body 3 includes a main body 13, a guide portion (guide) 15, a first slit portion (first slit) 17, a second slit portion (second slit) 19, and a positioning portion 27. As shown in FIGS. 1, 2, and 3, the main body 13 includes a head 13*a* at the front, a tail 13*b* at the rear, and an intermediate trunk 13*c* provided between the head 13*a* and the tail 13*b*.

Figure 1:
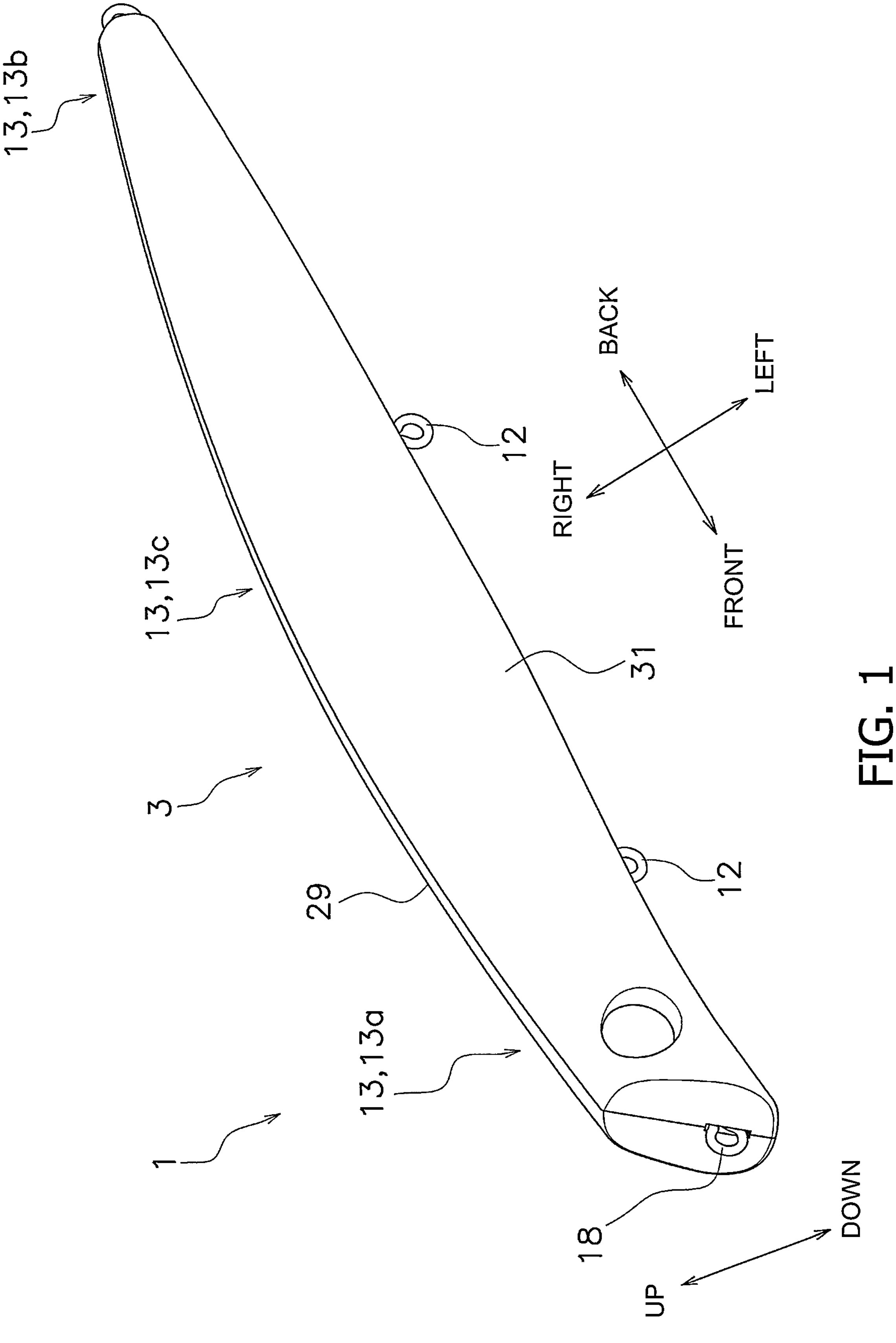
FIG. 1 is an external perspective view of a lure according to a first embodiment of the present disclosure.

As shown in FIG. 1, the outer shape of the main body 13 is formed in a streamlined shape that is long in one direction from the front to the rear. In the lure 1 in which a fishing line (not shown) is connected to a line eye 18, the direction of travel in which the lure 1 is pulled by the fishing line is determined as "front" and "forward." The direction of the water surface in a state in which the lure 1 travels forward in water is determined as "up." The direction below and away from the lure 1 toward the bottom is determined as "down." The left-right direction is perpendicular to the front-rear direction and the up-down direction. The intersecting direction intersects with the front-rear direction.

Main Body

As shown in FIG. 1, the main body 13 includes a first main body 29 and a second main body 31. The first main body 29 and the second main body 31 are formed by dividing the main body 13 with a plane defined by the front-rear direction and the up-down direction.

Figure 4:
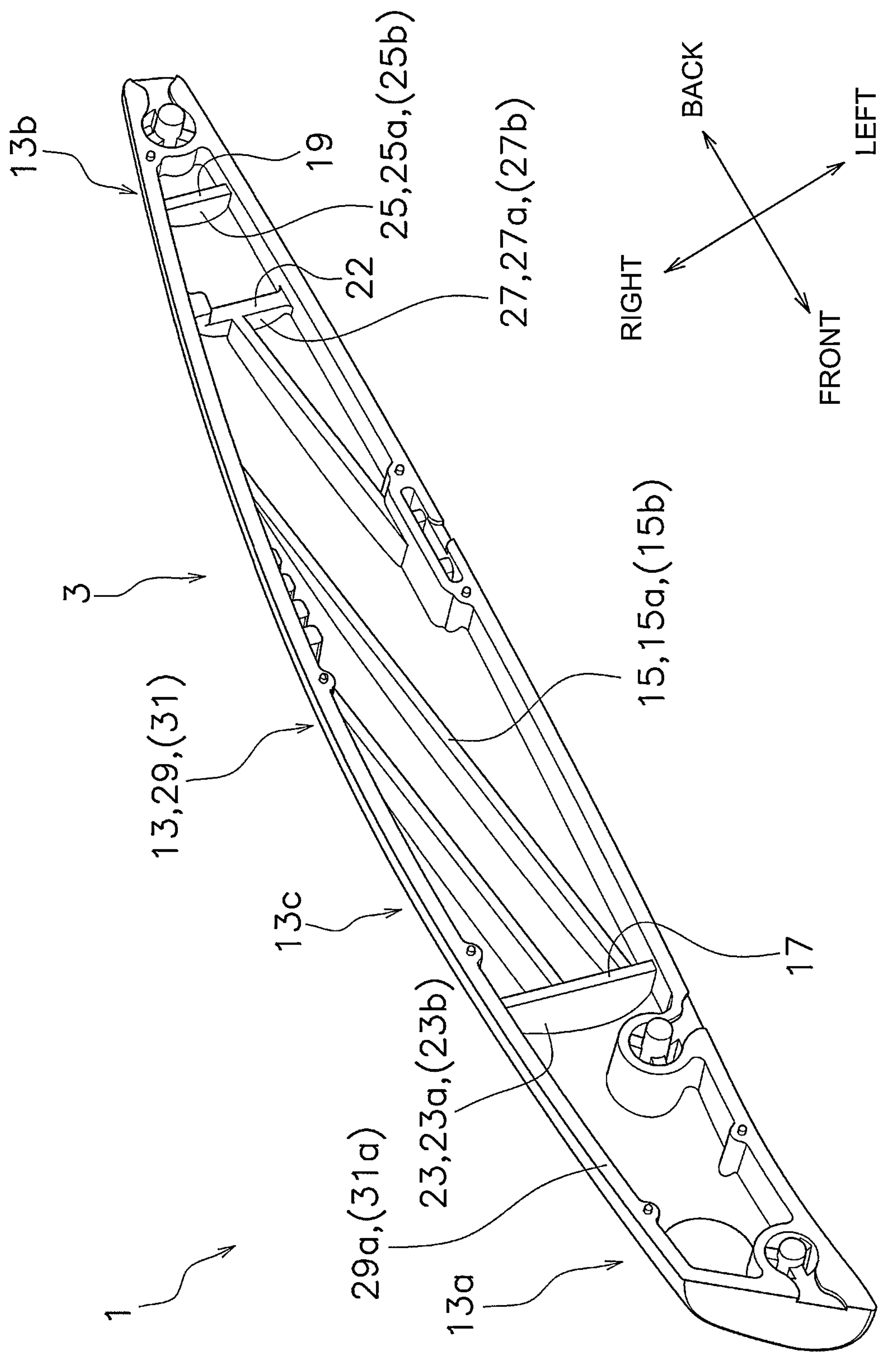
FIG. 4 is a perspective view for explaining the configuration of a body.

As shown in FIGS. 2, 3, and 4, the first main body 29 includes a first joining surface 29*a*. The first joining surface 29*a* extends in the front-rear direction. A first front wall 23*a* is provided on the inner side surface of the first main body 29 on the head 13*a* side. The first front wall 23*a* extends in the up-down direction. A first rear wall 25*a* is provided on the inner side surface of the first main body 29 on the tail 13*b* side. The first rear wall 25*a* extends in the up-down direction.

A first positioning wall 27*a* is provided on the inner side surface of the first main body 29 on the tail 13*b* side. The first positioning wall 27*a* is provided between the first front wall 23*a* and the first rear wall 25*a* in the front-rear direction. The first positioning wall 27*a* extends in the up-down direction.

As shown in FIG. 1, the second main body 31 is disposed facing the first main body 29. The second main body 31 is configured to be a mirror image of the first main body 29. That is, the configuration of the second main body 31 is essentially the same as the configuration of the first main body 29. Therefore, configurations of the second main body 31 corresponding to configurations of the first main body 29 are given the symbol b, and the configurations of the second main body 31 given the symbol b are indicated in parentheses in FIGS. 2, 3, and 4.

As shown in FIGS. 2, 3, and 4, when the first joining surface 29*a* of the first main body 29 is joined with the joining surface 29*b* of the second main body 31, an internal space S is formed between the first main body 29 and the second main body 31. In this state, the first front wall 23*a* and a second front wall 23*b* are arranged spaced apart from each other in the left-right direction. With this configuration, the first slit portion 17, described further below, is formed on the front wall 23. The support part 5 is inserted in the first slit portion 17.

The first rear wall 25*a* and a second rear wall 25*b* are arranged spaced apart from each other in the left-right direction. With this configuration, the second slit portion 19 is formed on the rear wall 25. The support part 5 is inserted in the second slit portion 19.

The first positioning wall 27*a* and a second positioning wall 27*b* form the positioning portion 27. The first positioning wall 27*a* and the second positioning wall 27*b* are arranged spaced apart from each other in the left-right direction. With this configuration, a third slit portion 22 is formed in the positioning portion 27. The support part 5 is inserted in the third slit portion 22.

Guide Portion

As shown in FIGS. 2 and 3, the guide portion 15 is used to guide the weight 7 in the front-rear direction and/or the intersecting direction. The guide portion 15 is provided on the inner surface of the main body 13. In the present embodiment, the guide portion 15 positions the center of gravity of the weight upward as the weight 7 moves toward the first position on the head 13*a* side shown in FIG. 2 and toward the second position on the tail 13*b* side shown in FIG. 3.

As shown in FIG. 2, the first position on the head 13*a* side is a position at which the weight 7 is disposed farthest forward on the head 13*a* side. As shown in FIG. 3, the second position on the tail 13*b* side is a position at which the weight 7 is disposed farthest rearward on the tail 13*b* side.

As shown in FIGS. 2, 3, 4, and 5, the guide portion 15 has a first protruding portion 15*a* and a second protruding portion 15*b*. The first protruding portion 15*a* is provided on the inner surface of the first main body 29, for example, on the inner side surface of the first main body 29. The first protruding portion 15*a* protrudes from the inner side surface of the first main body 29. The second protruding portion 15*b* is provided on the inner surface of the second main body 31, for example on the inner side surface of the second main body 31. The second protruding portion 15*b* protrudes from the inner side surface of the second main body 31.

Figure 5:
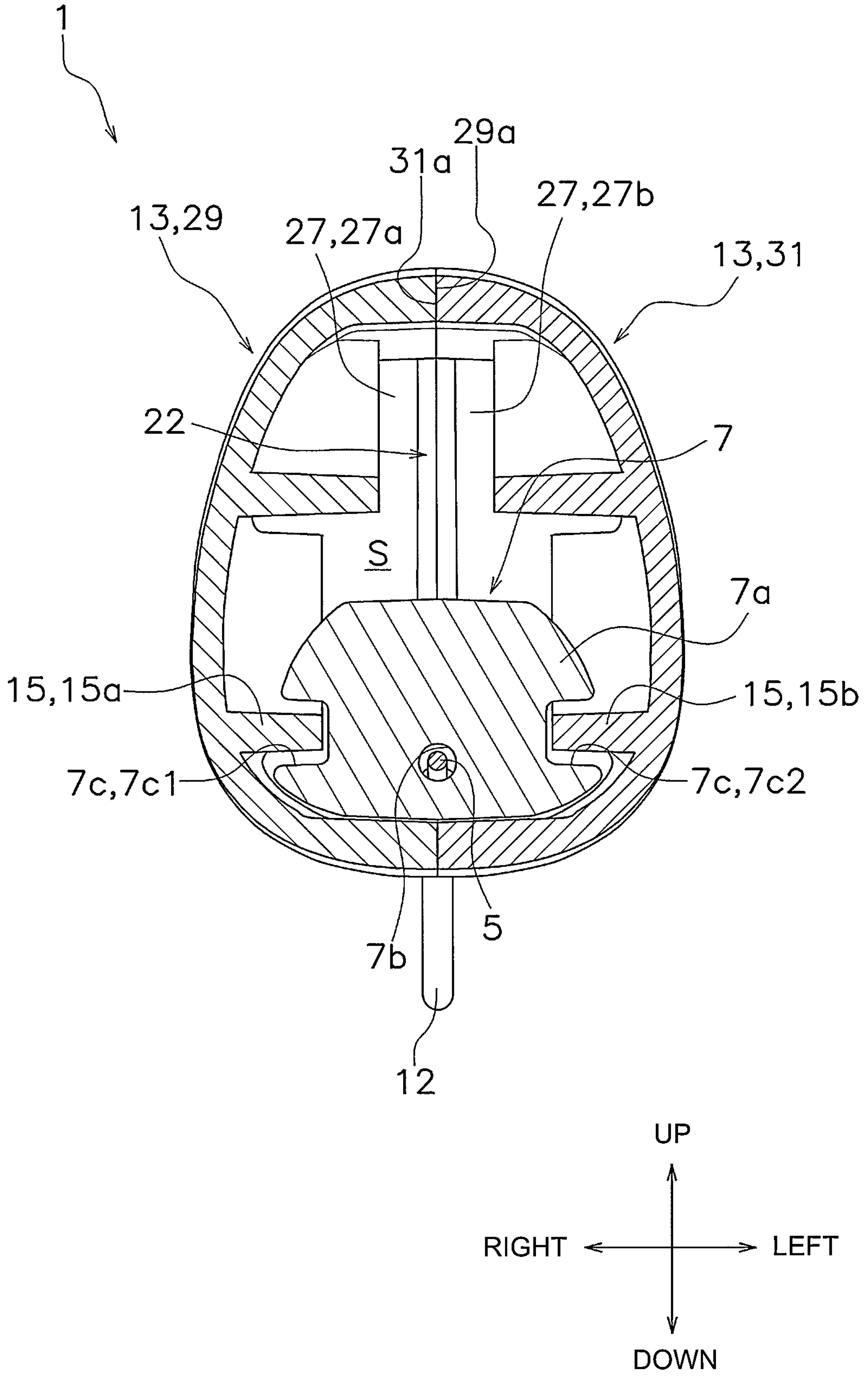
FIG. 5 is a cross-sectional view of the lure taken along the section line Vin FIG. 2.

As shown in FIGS. 2, 3, and 5, the first protruding portion 15*a* and the second protruding portion 15*b* extend in the front-rear direction and/or the intersecting direction such that, when in the first position on the head 13*a* side (refer to FIG. 2), the weight 7 is located below the second position on the tail 13*b* side (refer to FIG. 3). In the present embodiment, the first protruding portion 15*a* and the second protruding portion 15*b* extend in the intersecting direction such that the weight 7 moves upward from the first position on the head 13*a* side (refer to FIG. 2) to the second position on the tail 13*b* side (refer to FIG. 3).

Specifically, as shown in FIG. 4, in a side view of the inner side surface of the first main body 29 as viewed from the second main body 31 side, the first protruding portion 15*a* extends, from the head 13*a* to the tail 13*b*, diagonally upward from the lower portion of the first main body 29 to the upper portion of the first main body 29. The front end of the first protruding portion 15*a* is connected to the lower portion of the front wall 23 of the first main body 29 on the head 13*a* side. The rear end of the first protruding portion 15*a* is connected to the upper inner surface of the first main body 29.

The second protruding portion 15*b* is provided on the inner surface of the second main body 31. The second protruding portion 15*b* is provided on the inner surface of the second main body 31 so as to be a mirror image of the first protruding portion 15*a*. Therefore, the explanation of the first protruding portion 15*a* applies to the explanation of the second protruding portion 15*b*.

Figure 6:
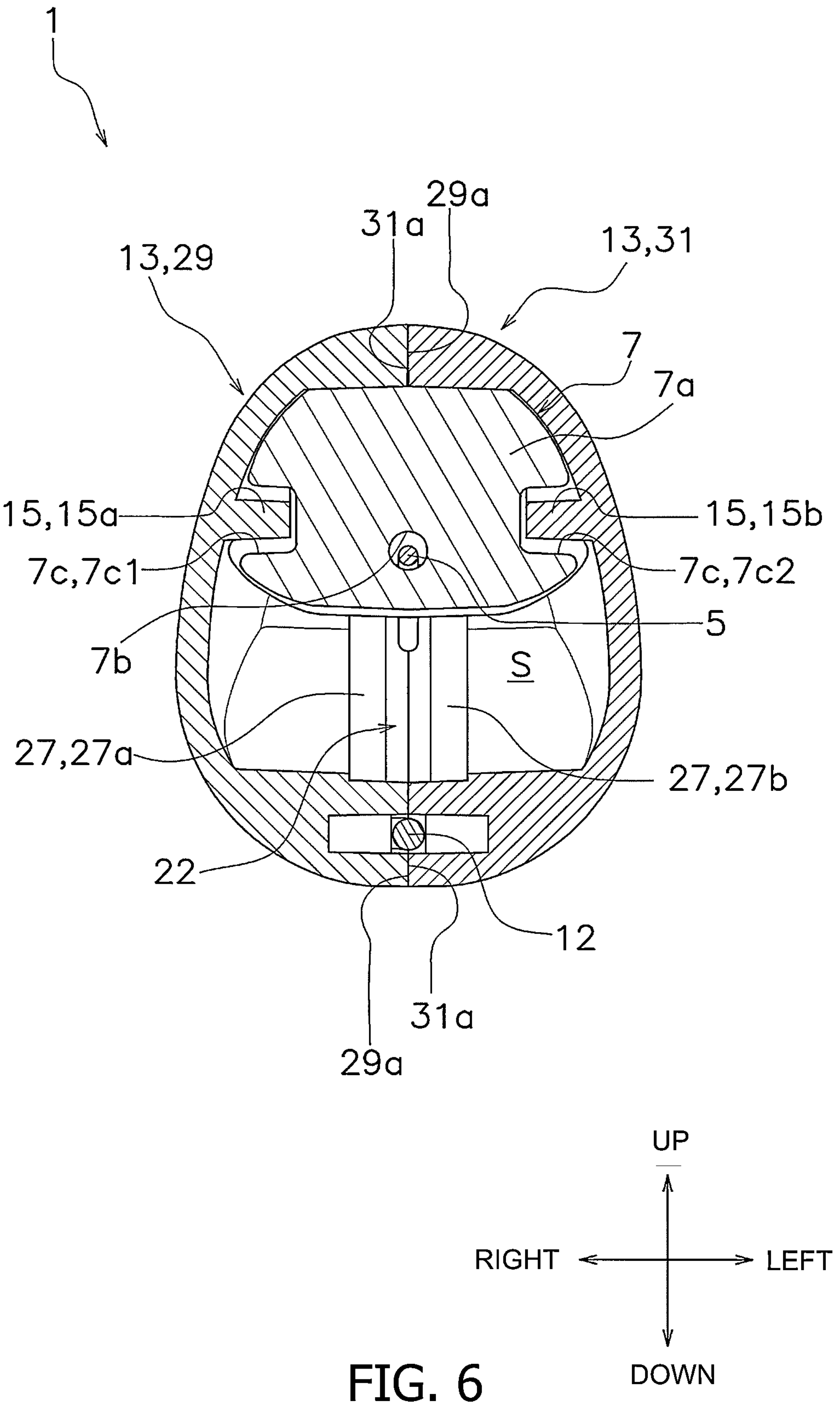
FIG. 6 is a cross-sectional view of the lure taken along the section line VI in FIG. 3.

In a state in which the first main body 29 is joined to the second main body 31, the first protruding portion 15*a* and the second protruding portion 15*b* are arranged facing each other. In this state, the first protruding portion 15*a* and the second protruding portion 15*b* respectively engage with a first engagement recess 7*c*1 of the weight 7 and a second engagement recess 7*c*2 of the weight 7, as shown in FIGS. 5 and 6. FIG. 5 is a cross-sectional view taken along the section line V in FIG. 2. FIG. 6 is a cross-sectional view taken along the section line VI in FIG. 3.

Slit Portions

As shown in FIGS. 2, 3, and 4, the first slit portion 17 is provided inside the main body 13 on the head 13*a* side. Specifically, in a state in which the first main body 29 and the second main body 31 are joined together, the first slit portion 17 is provided between the first front wall 23*a* of the first main body 29 and the second front wall 23*b* of the second main body 31. The first slit portion 17 guides the front end portion of the support part 5 in the intersecting direction. Specifically, the first slit portion 17 guides the front end portion of the support part 5 in the up-down direction.

As shown in FIGS. 2, 3, and 4, the second slit portion 19 is provided inside the main body 13 on the tail 13*b* side. Specifically, in a state in which the first main body 29 and the second main body 31 are joined together, the second slit portion 19 is provided between the first rear wall 25*a* of the first main body 29 and the second rear wall 25*b* of the second main body 31. The second slit portion 19 guides the rear end portion of the support part 5 in the intersecting direction. Specifically, the second slit portion 19 guides the rear end portion of the support part 5 in the up-down direction.

Positioning Portion

As shown in FIGS. 2, 3, and 4, the positioning portion 27 is provided inside the main body 13 on the tail 13*b* side. Specifically, as shown in FIGS. 5 and 6, in a state in which the first main body 29 and the second main body 31 are joined together, the positioning portion 27 is formed by the first positioning wall 27*a* of the first main body 29 and the second positioning wall 27*b* of the second main body 31.

As shown in FIG. 3, the positioning portion 27 positions the weight 7 at the second position on the tail 13*b* side. Specifically, when the weight 7 moves rearward, the rear portion of the weight 7 abuts against the positioning portion 27, whereby the weight 7 is positioned at the second position on the tail 13*b* side.

As shown in FIGS. 2, 3, and 4, the third slit portion 22 of the positioning portion 27 is provided inside the main body 13 on the tail 13*b* side. Specifically, as shown in FIGS. 5 and 6, in a state in which the first main body 29 and the second main body 31 are joined together, the third slit portion 22 is provided between the first positioning wall 27*a* of the first main body 29 and the second positioning wall 27*b* of the second main body 31. As shown in FIGS. 2 and 3, the third slit portion 22 guides the rear portion of the support part 5 in the intersecting direction. Specifically, the second slit portion 19 guides the rear end portion of the support part 5 in the up-down direction.

Support Part

As shown in FIGS. 2 and 3, the support part 5 supports the weight 7. The support part 5 extends essentially in the front-rear direction inside the main body 13. The support part 5 is configured to be able to elastically deform. The support part 5 is disposed in the main body 13. Specifically, the support part 5 is a shaft member that is long in one direction. The support part 5 is preferably a wire that can be elastically deformed. The front end portion of the support part 5 is inserted in the first slit portion 17. The rear portion of the support part 5 is inserted in the third slit portion 22. The rear end portion of the support part 5 is inserted in the second slit portion 19.

In this state, when the weight 7 moves along the guide portion 15, the support part 5 is elastically deformed in the intersecting direction, and the front end portion of the support part 5, the rear portion of the support part 5, and the rear end portion of the support part 5, respectively move inside the first slit portion 17, the third slit portion 22, and the inside of the second slit portion 19 in the up-down direction, in accordance with the location of the weight 7.

Weight

As shown in FIGS. 2 and 3, the weight 7 is supported by the support part 5 inside the main body 13. The weight 7 moves along the guide portion 15. The weight 7 moves between the first position on the head 13*a* side (refer to FIG. 2) and the second position on the tail 13*b* side (refer to FIG. 3). The first position on the head 13*a* side is the position at which the front portion of the weight 7 abuts against the front wall 23. The second position on the tail 13*b* side is the position at which the rear portion of the weight 7 abuts against the positioning portion 27.

As shown in FIGS. 5 and 6, the weight 7 includes a weight main body 7*a*, a hole portion 7*b*, and an engagement portion 7*c*. The hole portion 7*b* is provided in the weight main body 7*a*. The hole portion 7*b* penetrates the weight main body 7*a* in the front-rear direction. The support part 5 is inserted into the hole portion 7*b*. The engagement portion 7*c* is provided on the outer surface of the weight main body 7*a*. The engagement portion 7*c* engages with the guide portion 15. The engagement portion 7*c* has the first engagement recess 7*c*1 and the second engagement recess 7*c*2.

The first engagement recess 7*c*1 and the second engagement recess 7*c*2 are separately provided on the outer surface of the weight 7, for example, on both side surfaces of the weight 7. Each of the first engagement recess 7*c*1 and the second engagement recess 7*c*2 is recessed in a concave shape from each side surface of the weight 7. The first engagement recess 7*c*1 and the second engagement recess 7*c*2 respectively engage with the first protruding portion 15*a* of the guide portion 15 and the second protruding portion 15*b* of the guide portion 15. In this state, the weight main body 7*a* is disposed between the first protruding portion 15*a* and the second protruding portion 15*b*.

Restricting Member

As shown in FIGS. 2 and 3, the restricting member 9 serving as the restricting portion restricts at least one end portion of the support part 5 from moving in the front-rear direction relative to the main body 13. In the present embodiment, the restricting member 9 restricts the rear end portion of the support part 5 from moving forward relative to the main body 13.

The restricting member 9 is attached to the rear end portion of the support part 5. Specifically, the restricting member 9 is a member that is larger than the width of the second slit portion 19. In the present embodiment, the restricting member 9 is caulked to the rear end portion of the support member 5.

The restricting member 9 is disposed behind the first rear wall 25*a* and the second rear wall 25*b*. Specifically, the restricting member 9 is disposed in a space surrounded by the inner surface of the tail 13*b* of the main body 13, the rear surface of the first rear wall 25*a*, and the rear surface of the second rear wall 25*b*.

Biasing Member

As shown in FIGS. 2 and 3, the biasing member 11 biases the weight 7 at least in the forward direction. In the present embodiment, the biasing member 11 is a coil spring. The biasing member 11 is disposed between the weight 7 and the rear wall 25. Specifically, the biasing member 11 is disposed between the weight 7 and a spring receiving member disposed in front of the rear wall 25. The biasing member 11 is compressed in a state in which the weight 7 is disposed at the first position on the head 13*a* side.

In the lure 1 having the configuration described above, the weight 7 moves along the guide portion 15 (first protruding portion 15*a* and second protruding portion 15*b*) between either one of the first position on the head 13*a* side (refer to FIG. 2) and the second position on the tail 13*b* side (refer to FIG. 3), and the other of the first position on the head 13*a* side and the second position on the tail 13*b* side. When this weight 7 moves, the support part 5 elastically deforms in the intersecting direction in accordance with the position of the weight 7.

With this configuration, it is possible to suitably set the position of the center of gravity of the lure 1 while stabilizing the attitude and the position of the center of gravity of the weight 7.

Additionally, in the lure 1, the restricting member 9 restricts the rear end portion of the support part 5 from moving forward relative to the main body 13, so the support part 5 can be reliably positioned with respect to the main body 13 by the restricting member 9.

In addition, in the lure 1, the first slit portion 17 and the second slit portion 19 guide both end portions of the support part 5 in the intersecting direction (up-down direction), so the direction of movement of the support part 5 can be easily set with the first slit portion 17 and the second slit portion 19.

Additionally, in the lure 1, the guide portion 15 (first protruding portion 15*a* and second protruding portion 15*b*) extend in the front-rear direction and/or the intersecting direction such that, when in the second position on the tail 13*b* side (refer to FIGS. 3 and 6), the weight 7 is located above the first position on the head 13*a* side (refer to FIGS. 3 and 5). With this configuration, when the weight 7 is located at the second position on the tail 13*b* side, the center of gravity of the lure 1 can be set high on the tail 13*b* side.

In addition, in the lure 1, the first protruding portion 15*a* of the guide portion 15 and the second protruding portion 15*b* of the guide portion 15 respectively engage with the first engagement recess 7*c*1 of the weight 7 and the second engagement recess 7*c*2 of the weight 7, so it is possible to stably move the weight 7 along the guide portion 15.

Additionally, in the lure 1, the biasing member 11 biases the weight 7 at least in the forward direction, so the weight 7 can be easily returned to the head 13*a* side.

Modified Example

One embodiment of the present disclosure was described above, but the present disclosure is not limited to the above-described first embodiment, and various modifications can be made without departing from the scope of the disclosure.

In the first embodiment, an example was shown in which the guide portion 15 (first protruding portion 15*a* and second protruding portion 15*b*) extends, from the head 13*a* to the tail 13*b*, diagonally upward from the lower portion of the main body 13 to the upper portion of the main body 13. As long as the guide portion 15 can guide the weight 7 in either one of the front-rear direction or the intersecting direction, the guide portion 15 may extend in a direction different from that of the first embodiment, in a mode that is different from that of the first embodiment.

In the first embodiment, an example was shown in which the guide portion 15 (first protruding portion 15*a* and second protruding portion 15*b*) protrudes from the inner surface of the main body 13. The guide portion 15 may be recessed from the inner surface of the main body 13. In this case, the engagement portion 7*c* of the weight 7 is formed in a convex shape.

In the first embodiment, an example was shown in which the restricting member 9 is attached to the rear end portion of the support part 5. The restricting member 9 may be attached to both the front end portion and the rear end portion of the support part 5. In addition, the restricting member 9 may be attached only to the front end portion of the support part 5. In this case, the restricting member 9 provided on the front end portion of the support part 5 is disposed in front of the front wall 23 (first front wall 23*a* and second front wall 23*b*). This restricting member 9 restricts the front end portion of the support part 5 from moving rearward relative to the main body 13.

Second Embodiment

The configuration of the second embodiment is essentially the same as the configuration of the first embodiment, except for the configuration of the body 3 of the first embodiment and the configuration of the weight 7 of the first embodiment. In the second embodiment, configurations that are the same as the first embodiment are given the same codes as the first embodiment. In the second embodiment, descriptions of configurations that are the same as the first embodiment are omitted. The descriptions of configurations omitted in the second embodiment follows the descriptions in the first embodiment.

Figure 7:
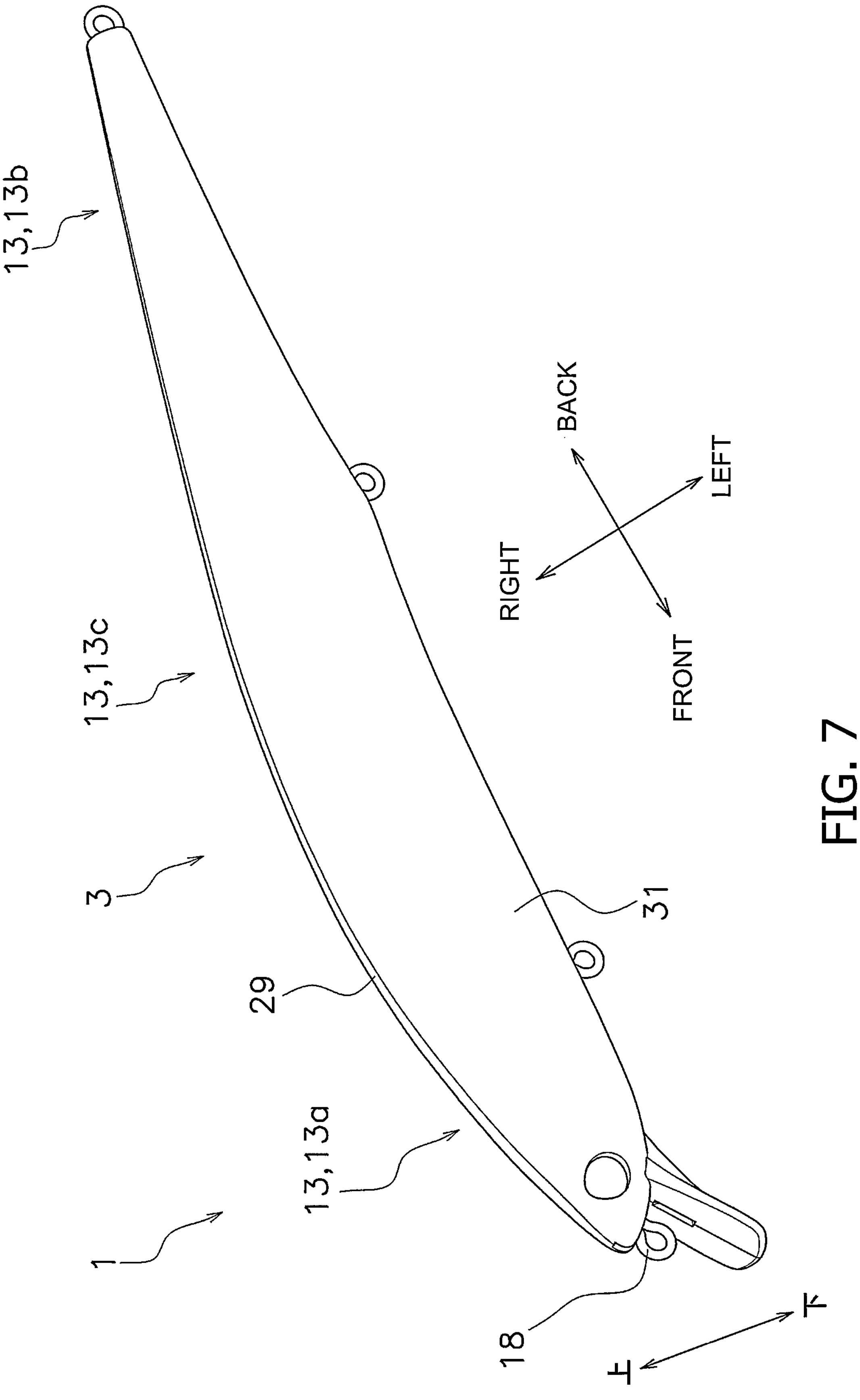
FIG. 7 is an external perspective view of a lure according to a second embodiment of the present disclosure.
Figure 8:
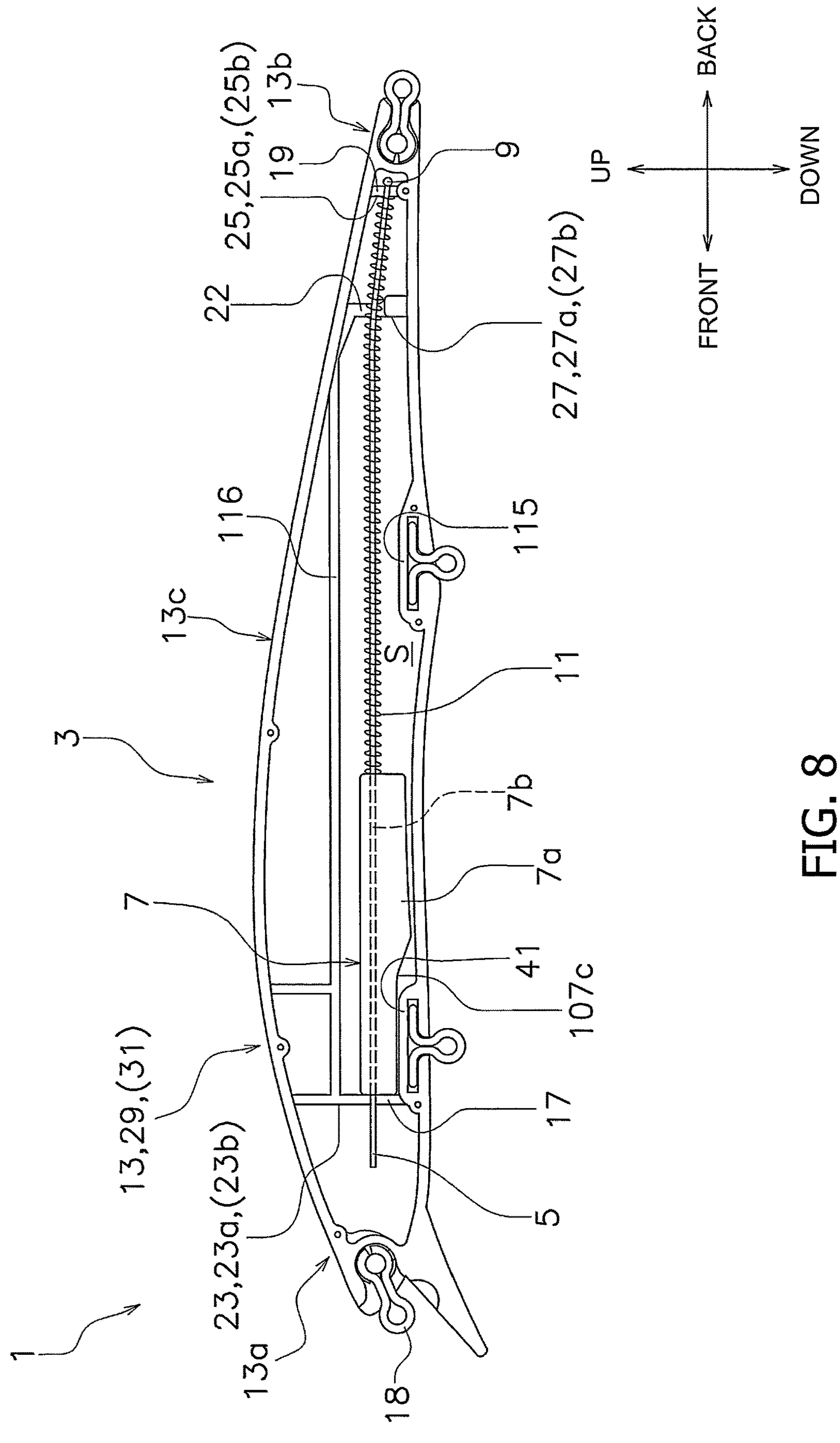
FIG. 8 is a perspective view for explaining an internal structure of the lure when the weight is located on the head side.
Figure 9:
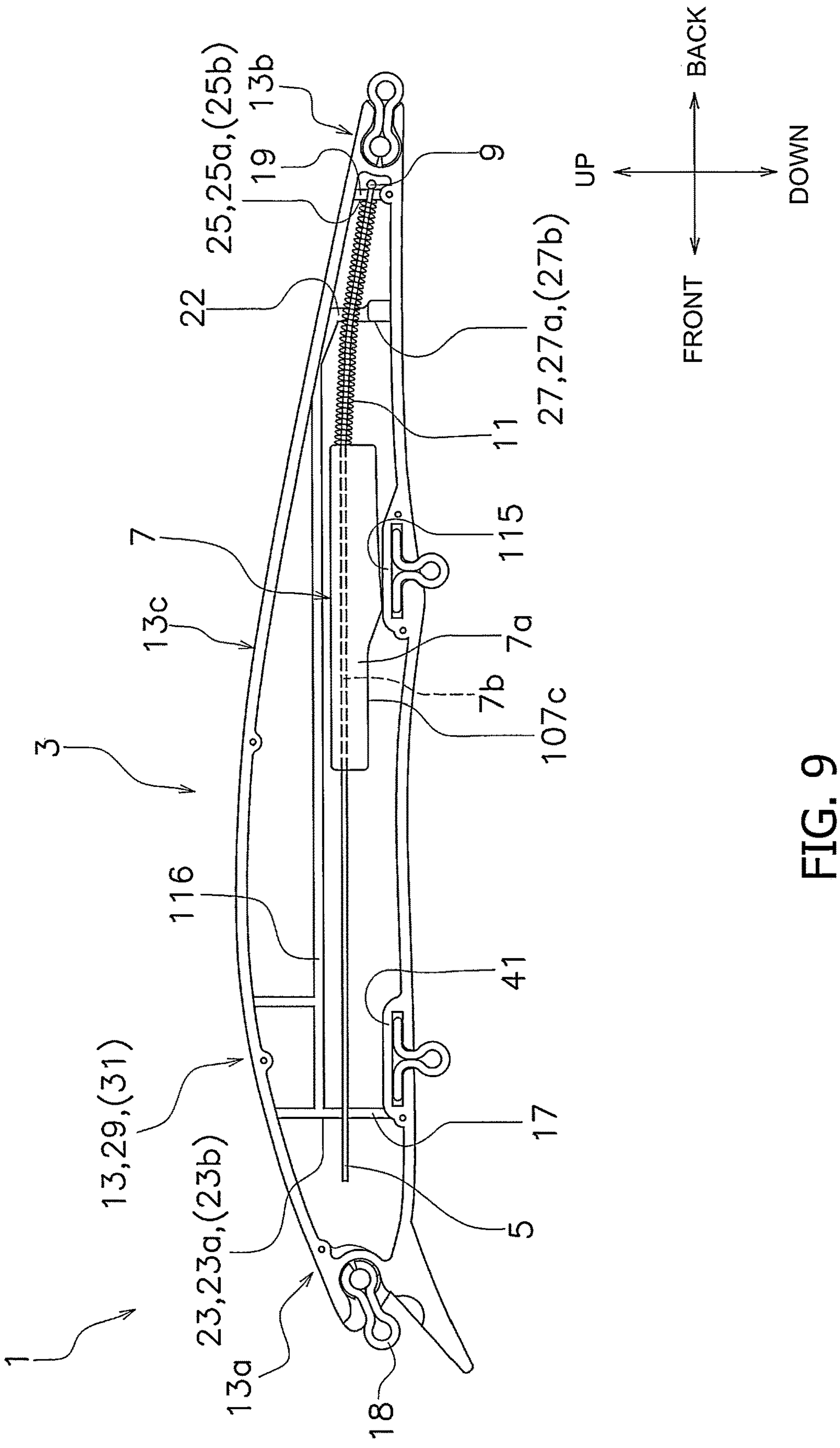
FIG. 9 is a perspective view for explaining an internal structure of the lure when the weight passes through the trunk.
Figure 10:
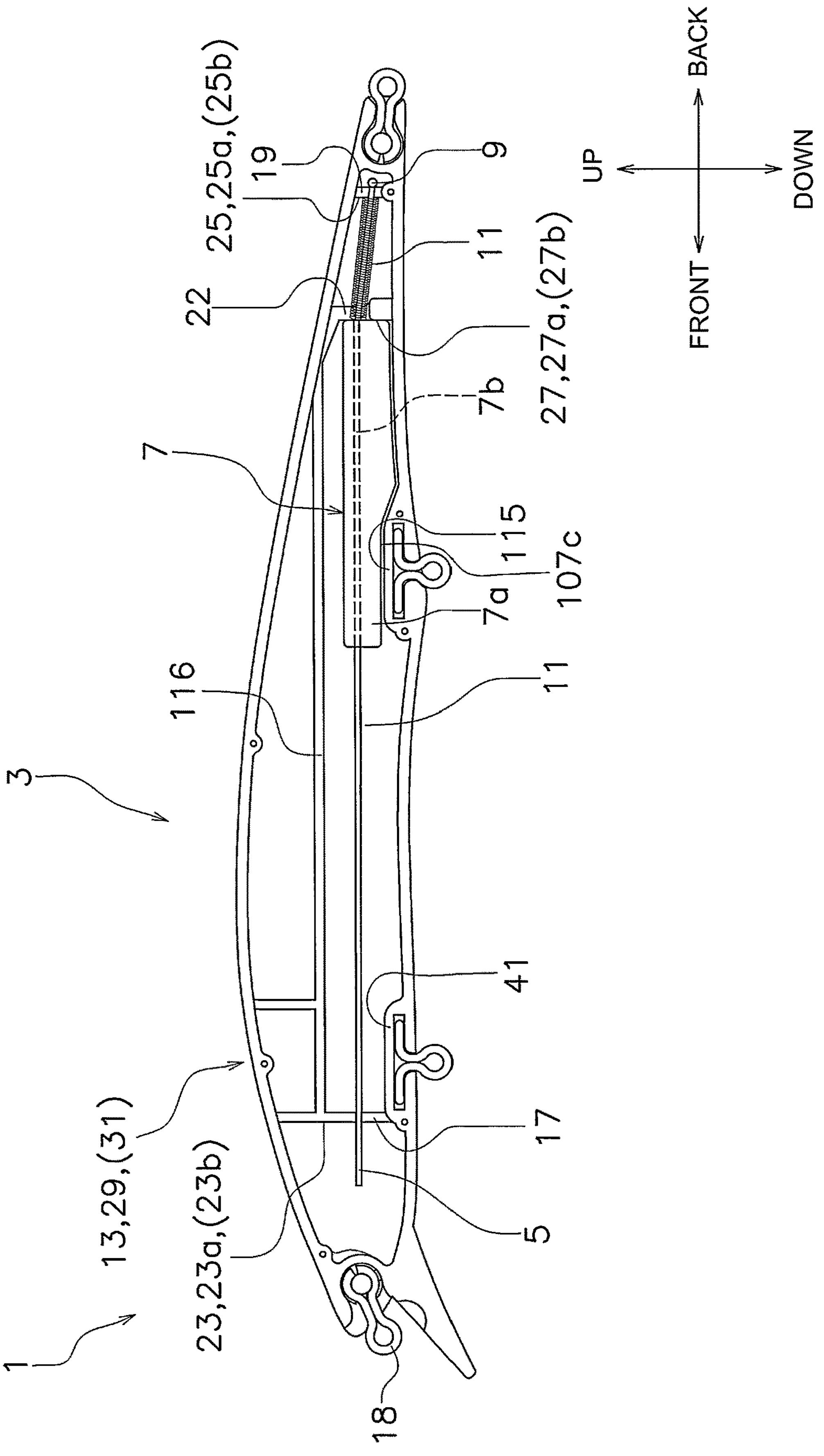
FIG. 10 is a perspective view for explaining an internal structure of the lure when the weight is located on the tail side.

As shown in FIG. 7, the outer shape of the main body 13 is formed in a a streamlined shape that is long in one direction from the front to the rear. As shown in FIGS. 8, 9, and 10, the lure 1 comprises the body 3, the support part 5, the weight 7, and the biasing member 11. The body 3 includes the main body 13, a first hook eye housing protrusion 41, a second hook eye housing protrusion 115, a guide rib 116, the first slit portion 17, the second slit portion 19, and the positioning portion 27.

As shown in FIGS. 8, 9, and 10, the first hook eye housing protrusion 41 is provided on the inner surface of the main body 13. Specifically, the first hook eye housing protrusion 41 is provided on the lower inner surface of the head 13*a* of the main body 13. The first hook eye housing protrusion 41 is a protruding portion that protrudes upward from the lower inner surface of the head 13*a*. In the present embodiment, in a state in which the first main body 29 and the second main body 31 are joined together, the first hook eye housing protrusion 41 is formed to protrude upward from the lower inner surface of the head 13*a*.

As shown in FIGS. 8, 9, and 10, the second hook eye housing protrusion 115 is provided on the inner surface of the main body 13. Specifically, the second hook eye housing protrusion 115 is provided on the lower inner surface of the trunk 13*c* of the main body 13. The second hook eye housing protrusion 115 is a protruding portion that protrudes upward from the lower inner surface of the trunk 13*c*. In the present embodiment, in a state in which the first main body 29 and the second main body 31 are joined together, the second hook eye housing protrusion 115 is formed to protrude upward from the lower inner surface of the trunk 13*c*.

As shown in FIGS. 8, 9, and 10, the guide rib 116 guides the weight 7 in the front-rear direction and limits the upward movement of the weight 7. The guide rib 116 is provided on the inner surface of the main body 13. The guide rib 116 is provided on the inner surface of the main body 13 above the first hook eye housing protrusion 41 and the second hook eye housing protrusion 115. In the present embodiment, in a state in which the first main body 29 and the second main body 31 are joined together, the guide rib 116 is provided on the inner surface of the main body 13, spaced apart from the first hook eye housing protrusion 41 and the second hook eye housing protrusion 115 in the up-down direction.

As shown in FIG. 8, the weight 7 is formed so as to avoid the first hook eye housing protrusion 41 when disposed at the first position on the head 13*a* side. As shown in FIG. 10, the weight 7 is formed so as to avoid the second hook eye housing protrusion 115 when disposed at the second position on the tail 13*b* side. Specifically, as shown in FIGS. 8, 9, and 10, the weight 7 includes the weight main body 7*a*, the hole portion 7*b*, and a step portion 107*c*. The hole portion 7*b* is provided in the weight main body 7*a*. The hole portion 7*b* penetrates the weight main body 7*a* in the front-rear direction. The support part 5 is inserted into the hole portion 7*b*.

As shown in FIGS. 8, 9, and 10, the step portion 107*c* is provided on the lower surface of the weight main body 7*a* at the front portion of the weight main body 7*a*. The step portion 107*c* is formed in a stepped shape such that the lower surface of the front portion of the weight main body 7*a* is positioned above the lower surface of the rear portion of the weight main body 7*a*. The depth of the step of the step portion 107*c* is preferably greater than the height of the first hook eye housing protrusion 41 and the height of the rear portion of the second hook eye housing protrusion 115.

As shown in FIGS. 8, 9, and 10, the weight 7 is disposed below the guide rib 116. In this state, the weight 7 moves in the front-rear direction along the guide rib 116. As shown in FIG. 8, when the weight 7 is disposed at the first position on the head 13*a* side, the weight 7 is disposed in front of the second hook eye housing protrusion 115.

In this case, the step portion 107*c* is disposed on the first hook eye housing protrusion 41. As a result, the front portion of the weight 7 is disposed between the guide rib 116 and the first hook eye housing protrusion 41 in the up-down direction. That is, due to the presence of the step portion 107*c* of the front portion of the weight 7, the weight 7 does not interfere with the first hook eye housing protrusion 41. The position and attitude of the weight 7 in the front-rear direction are determined by the front wall 23 and the biasing member 11.

While the weight 7 moves between the first position on the head 13*a* side (refer to FIG. 8) and the second position on the tail 13*b* side (refer to FIG. 10), as shown in FIG. 9, the second hook eye housing protrusion 115 functions as a guide portion and positions the center of gravity of the weight 7 upward. As a result, the weight 7 moves between the guide rib 116 and the second hook eye housing protrusion 115 in the up-down direction.

In this case, the lower surface of the weight 7 comes in contact with the upper surface of the second hook eye housing protrusion 115, which functions as a guide portion. The step portion 107*c* is disposed spaced apart from the upper surface of the second hook eye housing protrusion 115. When this weight 7 moves, the support part 5 elastically deforms in the intersecting direction in accordance with the position of the weight 7 that passes over the second hook eye housing protrusion 115.

As shown in FIG. 10, when the weight 7 is disposed at the second position on the head 13*a* side, the rear portion of the weight 7 is disposed rearward of the second hook eye housing protrusion 115. In this case, the step portion 107*c* is disposed on the second hook eye housing protrusion 115. As a result, the front portion of the weight 7 is disposed between the guide rib 116 and the second hook eye housing protrusion 115 in the up-down direction. That is, due to the presence of the step portion 107*c* of the front portion of the weight 7, the weight 7 does not interfere with the second hook eye housing protrusion 115.

In this configuration, the weight 7 is offset upward in the trunk 13*c* when moving between the first position on the head 13*a* side (refer to FIG. 8) and the second position on the tail 13*b* side (refer to FIG. 10). Specifically, the weight 7 avoids the second hook eye housing protrusion 115 when moving from one of the first position on the head 13*a* side (refer to FIG. 8) and the second position on the tail 13*b* side (refer to FIG. 10), to the other of the first position on the head 13*a* side (refer to FIG. 8) and the second position on the tail 13*b* side (refer to FIG. 10). As a result, it is possible to set the center of gravity of the lure 1 to be low when the weight is disposed in the first position on the head 13*a* side (refer to FIG. 8) and the second position (refer to FIG. 10).

Modified Example

One embodiment of the present disclosure was described above, but the present disclosure is not limited to the above-described second embodiment, and various modifications can be made without departing from the scope of the disclosure.

In the second embodiment, an example was shown in which the restricting member 9 is attached to the rear end portion of the support part 5. The restricting member 9 may be attached only tot the front end portion of the support part 5, or to both the front end portion and the rear end portion of the support part 5. In this case, the restricting member 9 provided on the front end portion of the support part 5 is disposed in front of the front wall 23 (first front wall 23*a* and second front wall 23*b*). This restricting member 9 restricts the front end portion of the support part 5 from moving rearward relative to the main body 13.

Additional Embodiments

In the first and second embodiments, examples were shown in which the lure 1 has the guide portion 15 and the guide rib 116, but the lure 1 may be configured without using the guide portion 15 and the guide rib 116 of the first embodiment.

In this case, the guide portion 15 is removed from FIGS. 2-6 of the first embodiment, and the guide rib 116 is removed from FIGS. 8-10 of the second embodiment. In this configuration, the weight 7 moves along the support part 5 in accordance with an external force that acts on the lure 1, in a state of being supported by the support part 5. At this time, the support part 5 elastically deforms in the intersecting direction in accordance with the position of the weight 7.

In addition, the weight 7 may be biased forward by the elastic force of the support part 5. Even with such a configuration, it is possible to suitably set the position of the center of gravity of the lure 1 while stabilizing the attitude and the position of the center of gravity of the weight 7.

What is claimed is:

1. A lure, comprising:
a main body having a head at a front portion and a tail at a rear portion,
a support part extending in a front-rear direction inside the main body and configured to elastically deform in an intersecting direction that intersects with the front-rear direction;
a weight slidably supported by the support part inside the main body; and
a guide portion provided on an inner surface of the main body and configured to guide the weight in the intersecting direction.

2. The lure according to claim 1, further comprising
a restricting portion configured to restrict at least one end portion of the support part from moving in the front-rear direction relative to the main body.

3. The lure according to claim 1, further comprising
slit portions provided on the head and configured to guide an end portion of the support part in the intersecting direction.

4. The lure according to claim 1, further comprising
a biasing member configured to bias the weight in at least a forward direction.

5. The lure according to claim 1, wherein the support part elastically deforms when the weight moves along the guide portion.

6. A lure, comprising
a main body having a head at a front portion and a tail at a rear portion;
a support part extending in a front-rear direction inside the main body and configured to elastically deform in an intersecting direction that intersects with the front-rear direction;
a weight slidably supported by the support part inside the main body; and
a guide portion provided on an inner surface of the main body and configured to guide the weight in the front-rear direction or the intersecting direction,
the weight configured to move between a first position at the front portion side and a second position at the rear portion, and
the guide portion extending in the front-rear direction or the intersecting direction such that, when in the second position at the rear portion, the weight is located above the first position at the front portion.

7. The lure according to claim 6, wherein
the guide portion is a protruding portion that protrudes from an inner surface of the main body, or a recessed portion that is recessed from the inner surface of the main body, and
the weight has an engagement portion configured to engage with the protruding portion or the recessed portion.

8. The lure according to claim 6, wherein
the main body further comprises a trunk provided between the head and the tail, and
the guide portion is provided in the trunk such that the weight moves in the trunk above the first position and the second position.

9. The lure according to claim 8, wherein
the guide portion is a protruding portion provided on a lower inner surface the trunk.

10. A lure, comprising:
a main body having a head at a front portion and a tail at a rear portion;
a support part extending in a front-rear direction inside the main body and configured to elastically deform in an intersecting direction that intersects with the front-rear direction;
a weight slidably supported by the support part inside the main body; and
a biasing member configured to bias the weight toward at least the head.

11. The lure according to claim 10, wherein the support part elastically deforms when the weight moves along the guide portion.

* * * * *